United States Patent [19]

Daniels

[11] 3,872,080

[45] Mar. 18, 1975

[54] PROCESS FOR THE PREPARATION OF GARAMINE AND INTERMEDIATES PRODUCED THEREBY

[75] Inventor: Peter J. L. Daniels, Cedar Grove, N.J.

[73] Assignee: Schering Corporation, Bloomfield, N.J.

[22] Filed: June 26, 1973

[21] Appl. No.: 373,692

[52] U.S. Cl. ........ 260/210 R, 424/180, 260/210 AB
[51] Int. Cl. .......................................... C07c 129/08
[58] Field of Search.................. 260/210 R, 210 AB

[56] References Cited
UNITED STATES PATENTS
3,356,674   12/1967   Ikeda et al. .......................... 260/209
3,737,425    6/1973   Bannister ......................... 260/210 R OTHER PUBLICATIONS
Whistler et al, Methods in Carbohydrate Chemistry, Academic Press, New York, 1965, pages 361–380.

Primary Examiner—Johnnie R. Brown
Assistant Examiner—Cary B. Owens
Attorney, Agent, or Firm—Mary S. King

[57] ABSTRACT

Amino-protected derivatives of garamine (useful intermediates in a process for producing pseudotrisaccharide antibacterial agents such as gentamicin $X_2$) are prepared by treating a pseudotrisaccharide having a garamine moiety glycosidically linked to another pyranoside sugar possessing vicinal hydroxyl groups (preferably vicinal trans diequatorial hydroxyl groups), said pseudotrisaccharide having amino-protecting groups (preferably carbobenzyloxy), with a glycol cleaving reagent (preferably sodium metaperiodate), treating the seco-dialdehyde derivative thereby formed with a metal borohydride, then treating the resulting seco-dihydroxy derivative with dilute aqueous acid. Typical starting compounds include the per-N-carbobenzyloxy derivatives of Antibiotic JI-20 Complex and the per-N-carbobenzyloxy derivatives of a gentamicin mixture comprising gentamicin B, gentamicin $B_1$ and gentamicin $X_2$.

23 Claims, No Drawings

PROCESS FOR THE PREPARATION OF GARAMINE AND INTERMEDIATES PRODUCED THEREBY

FIELD OF INVENTION

This invention relates to a novel process and to novel intermediates useful therein.

More specifically, this invention relates to an improved process for preparing garamine and amino-protected derivatives thereof, such compounds being pseudodisaccharides useful as intermediates, from pseudotrisaccharides, and to novel seco-dihydroxypseudotrisaccharide intermediates produced thereby.

In particular, this invention relates to the preparation of 1,3,3'-tri-N-substituted garamine from a pseudotrisaccharide having a garamine moiety glycosidically linked to another pyranoside sugar possessing vicinal hydroxyl groups, said pseudotrisaccharide having amino-protecting groups, and to novel seco-dihydroxypseudotrisaccharide intermediates produced thereby.

PRIOR ART

Garamine, a pseudodisaccharide having antibacterial activity and also being useful as an intermediate, and 1,3,3'-tri-N-substituted garamine, useful in a process for producing pseudotrisaccharide antibacterial agents such as gentamicin $X_2$, are described in copending application Ser. No. 296,434, filed Oct. 10, 1972, and now abandoned of Alan K. Mallams for NOVEL INTERMEDIATES AND METHODS FOR PRODUCING GENTAMICIN $X_2$. The method described and claimed therein for preparing 1,3,3'-tri-N-substituted garamine (and specifically 1,3,3'-tri-N-carbobenzyloxygaramine) comprises selectively hydrolyzing by means of acid a pseudotrisaccharide having the garamine moiety and a hex-4-enopyranoside moiety (e.g., sisomicin) said pseudotrisaccharide having N-protected groups (preferably carbobenzyloxy). The 1,3,3'-tri-N-substituted garamine thereby produced (e.g., 1,3,3'-tri-N-carbobenzyloxygaramine) is then convertible to garamine via conventional deblocking methods, such as alkaline hydrolysis.

In my copending application Ser. No. 373,693 filed on even date as the instant application for Process for the Preparation of Garamine and Derivatives Thereof, there is described and claimed an alternate method for preparing amino-protected garamine derivatives from different starting compounds, i.e., from a pseudotrisaccharide having a garamine moiety glycosidically linked to another pyranoside sugar possessing vicinal hydroxyl groups such as Antibiotic G-418, gentamicin B, gentamicin $B_1$ and gentamicin $X_2$, said process comprising treating said pseudotrisaccharide having amino-protected groups (preferably acetyl or benzoyl) with a glycol cleaving reagent (preferably sodium meta-periodate) and treating the thereby formed secodialdehyde pseudotrisaccharide derivative with a phenyl hydrazine and a lower alkanoic acid in water, e.g. phenylhydrazine in aqueous acetic acid, whereby is obtained a 1,3,3'-tri-N-protected garamine, e.g., 1,3,3'-tri-N-acetylgaramine or 1,3,3'-tri-N-benzoylgaramine.

The invention of the instant application provides an improved, more easily operated method for preparing amino-protected garamine derivatives from pseudotrisaccharides having a garamine moiety glycosidically linked to another pyranoside sugar possessing vicinal hydroxyl groups which advantageously produces 1,3,3'-tri-N-substituted garamine in greater yields than in the two methods discussed hereinabove. Moreover, the process of the instant application can be conveniently carried out using carbobenzyloxy protecting groups and thus, directly produces excellent yields of 1,3,3'-tri-N-carbobenzyloxygaramine, a preferred intermediate in the synthesis of gentamicin $X_2$ as disclosed in the copending application Ser. No. 296,434, filed Oct. 10, 1972 now abandoned of Alan K. Mallams.

My improved process utilizes a sequence of reactions similar to those described in the polysaccharide art by I. J. Goldstein, G. W. Hay, B. A. Lewis, and F. Smith: Controlled Degradation of Polysaccharides by Periodate Oxidation, Reduction, and Hydrolysis; Methods in Carbohydrate Chemistry, V, pp 361–380, Academic Press, New York, 1965 (hereinafter referred to as the "Smith Degradation"). Prior to my invention, however, it was unknown to selectively degrade an amino sugar moiety from a pseudooligosaccharide containing amino functions utilizing the Smith Degradation method, thus, it was unpredictable that, by this method, a glycosidically linked pyranoside sugar having amino functions, a particularly a 2-amino function such as in Antibiotics JI-20A, JI-20B, G-418 and in gentamicin $X_2$, would selectively cleave from a pseudotrisaccharide to produce a pseudodisaccharide such as garamine.

GENERAL DESCRIPTION OF THE INVENTION

In the process sought to be patented, a pseudotrisaccharide having a garamine moiety glycosidically linked to another pyranoside sugar which possesses vicinal hydroxyl groups, said pseudotrisaccharide having amino-protected groups, is treated with a glycol cleaving reagent whereby fission of the pyranoside sugar moiety occurs between the vicinal hydroxyl groups to produce a seco-dialdehyde pseudotrisaccharide derivative which is treated with a metal borohydride followed by treatment of the thereby produced seco-dihydroxypseudotrisaccharide derivative with dilute aqueous acid whereby cleavage of the seco-hydroxy sugar moiety occurs to yield a 1,3,3'-tri-N-substituted garamine which, upon alkaline hydrolysis, is converted to garamine.

Particularly useful pseudotrisaccharide starting compounds for my process are pseudotrisaccharides wherein the sugar glycocsidically linked to the garamine moiety possesses vicinal hydroxyl groups which are trans diequatorial to each other, including aminoglycosides such as gentamicins B, $B_1$, $X_2$, Antibiotic JI-20A, Antibiotic JI-20B, Antibiotic G-418 and mixtures thereof.

Glycol cleaving reagents useful in my process include lead-(IV)-salts, e.g., lead tetraacetate and phosphato-lead (IV)acids, and periodate salts, preferably sodium meta-periodate.

The metal borohydride reagent preferentially used in my process is sodium borohydride, although other metal borohydrides may be used such as potassium borohydride, lithium borohydride, and sodium cyanoborohydride.

Acids which are conveniently employed in my process to effect cleavage of the seco-dihydroxy sugar moiety from the garamine moiety in the pseudotrisaccharide intermediate of formula IV shown hereinbelow, include an acid ion exchange resin, e.g., Amberlite IR 120, sulfuric acid, perchloric acid and, preferably, hydrochloric acid.

My process is usually carried out in a non-reactive solvent in which the starting pseudotrisaccharide, glycol cleaving reagent and metal borohydride reagent are soluble. By "non-reactive" is meant a solvent which will not react with the pseudotrisaccharide or the reagents so as to cause transformations which will result in competing side reactions. When using a lead salt as cleaving reagent, my process is usually carried out in an organic solvent such as a lower alkanol or, preferably, a lower alkanoic acid. When utilizing a periodate as cleaving reagent, water may be used as solvent or a lower alkanol, methanol being a preferred solvent for the process of this invention.

The term "amino-protecting groups" is well known in the art. Included among such groups which are useful in my process are unsubstituted and functionally substituted acyl, alkoxycarbonyl, and arylalkoxycarbonyl groups, said groups being defined in accordance with their standard art meaning as set forth in standard chemical references (See Advances in Organic Chemistry, Methods and Results, Raphael R. A., Taylor E. C., and Wynberg H., Vol. 3, Interscience Publishers, New York 1963, pp. 159–162, 191–193.) Acyl amino-protecting groups include lower alkanoyl groups having up to eight carbon atoms such as acetyl, propionyl, and capryloyl; aroyl groups up to eight carbon atoms such as benzoyl, toluyl and xyloyl; and arylalkanoyl groups such as phenylacetyl. Examples of alkoxycarbonyl amino-protecting groups are methoxycarbonyl, ethoxycarbonyl, 2,2,2-trichloroethoxycarbonyl and t-butoxycarbonyl groups. Aryl-alkoxycarbonyl amino-protecting groups include benzyloxycarbonyl (also termed carbobenzyloxy) and 4-methoxybenzyloxycarbonyl groups. Amino-protecting groups particularly preferred for the process of this invention are aryl-alkoxycarbonyl groups, particularly carbobenzyloxy.

Garamine and 1,3,3'-tri-N-substituted garamine, the pseduodisaccharides produced by my process, are described in copending application Ser. No. 296,434, filed Oct. 10, 1972, and are represented by the following formula I:

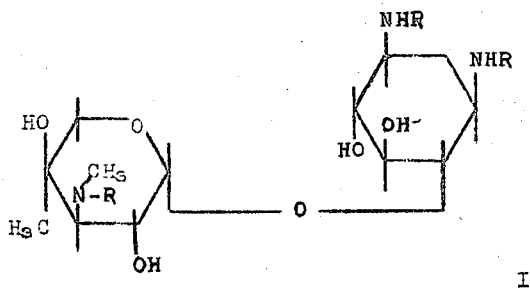

I wherein R is an amino-protecting group or hydrogen.

When R is hydrogen, the pseudodisaccharide has the chemical structure O-3-deoxy-4-C-methyl-3-methylamino-β-L-arabinopyranosyl-(1 → 6)-2-deoxy-D-streptamine as set forth in above formula I, and has been named "garamine", which compound possesses antibacterial activity per se, and may be used in treating conditions caused by S.aureus, E.coli, P.aeruginosa and other pathogenic organisms.

Compounds of formula I wherein R is an amino-protecting group (preferably benzyloxycarbonyl, i.e., carbobenzyloxy, for the process of this invention) are termed amino-protected derivatives of garamine and are the compounds directly produced by my process.

The derivatives may be used as is as intermediates for preparing pseudotrisaccharides utilizing either the Koenigs-Knorr or the Lemieux reactions with a monosaccharide as the other reactant. For example, gentamicin $X_2$, a known antibacterial agent, may be prepared from 1,3,3'-tri-N-carbobenzyloxygaramine and the monosaccharide 3,4,6-tri-O-acetyl-2-deoxy-2-nitroso-α-D-glycopyranosyl chloride via the well-known Lemieux procedure followed by reduction and removal of blocking groups.

Amino-protected garamine derivatives of formula I prepared by my process, e.g., 1,3,3'-N-carbobenzyloxygaramine, may be "deblocked" via known methods such as alkaline hydrolysis, and the garamine thereby produced may be converted utilizing known techniques to other amino-protected derivatives, e.g., to the 1,3,3'-tri-N-acetylgaramine, which may be more desirable for use in a given sequence of reactions.

Particularly useful amino-protected pseudotrisaccharide starting compounds for the process of this invention are aminoglycosides having a garamine moiety glycosidically linked to another pyranoside sugar bearing vicinal trans diequatorial hydroxyl groups such as those represented by the following formula II and mixtures thereof:

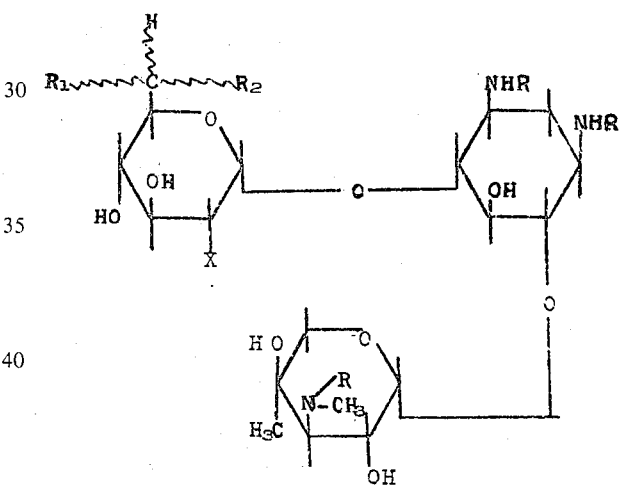

II wherein R is an amino-protecting group as defined hereinabove, preferably carbobenzyloxy; $R_1$ is a member selected from the group consisting of hydrogen and methyl; $R_2$ and X are each a member selected from the group consisting of hydroxy and —NHR.

The amino-protected derivatives represented by formula II are derived utilizing known techniques from aminoglycosides of formula II wherein R is hydrogen, including Antibiotic C-418 (compound of formula II wherein R is hydrogen, $R_1$ is methyl, $R_2$ is hydroxyl, X is amino) which is described in Belgian Pat. No. 787,758 granted Feb. 19, 1973; the well-known gentamicin B (R and $R_1$ are hydrogen, $R_2$ is amino, X is hydroxyl), gentamicin $B_1$ (R is hydrogen, $R_1$ is methyl, $R_2$ is amino, X is hydroxyl), and gentamicin $X_2$ (also known in the art as gentamicin X) (a compound of formula II wherein R and $R_1$ are hydrogen, $R_2$ is hydroxy, and X is amino); and Antibiotics JI-20A and JI-20B (R is hydrogen, $R_1$ is hydrogen and methyl, respectively, $R_2$ and X are each amino) which are described in copending application Ser. No. 261,753 filed June 12, 1972 and now abandoned of Jan Ilavsky, Aris P. Bayan, William Charney and Hans Reimann for NEW ANTI-

BIOTIC FROM MICROMONOSPORA PURPUREA JI-20.

In carrying out my process whereby amino-protected pseudotrisaccharides represented by formula II are degraded to pseudodisaccharides represented by formula I, i.e., to amino-protected garamine derivatives, a pseudotrisaccharide derivative represented by formula II, e.g., 1,3,6',3''-tetra-N-carbobenzyloxygentamicin $B_1$ (compound of formula II wherein R is carbobenzyloxy, $R_1$ is methyl, $R_2$ is amino and X is hydroxy), is usually dissolved in a lower alkanol or an aqueous alkanol, preferably methanol or aqueous methanol, and treated at temperatures in the range of from about 0°C to ambient temperatures with at least an equivalent quantity of a glycol cleaving reagent, preferably sodium metaperiodate, then allowed to react at room temperature until thin layer chromatographic analysis of an aliquot of the reaction solution indicator the absence of starting compound. When a periodate is employed as reagent, any excess periodate is usually removed by treatment with a calculated amount of ethylene glycol or until the reaction mixture gives a negative starch-iodide test followed by filtration to remove any insoluble inorganic salts. Alternatively, the periodate and iodate ions may be removed by precipitation with lead acetate, followed by removal of the excess lead ions by means of dilute sulfuric acid. After removal of the periodate and other inorganic salts, there remains a solution of the seco-dialdehyde oxidation product which may be represented by the following formula III:

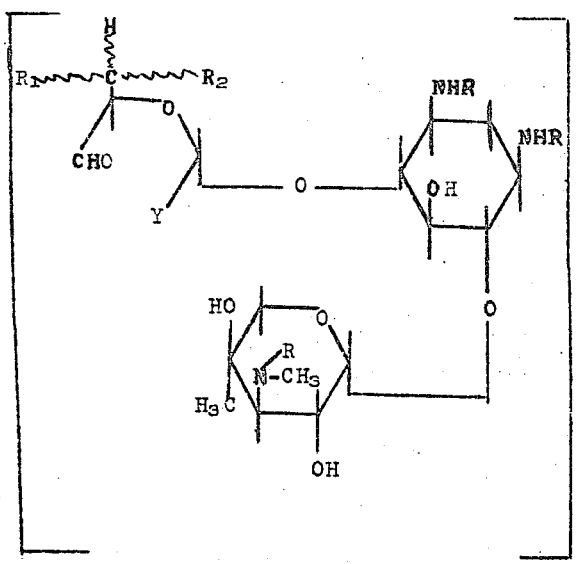

III wherein R, $R_1$ and $R_2$ are as defined in formulae I and II, and Y is a member selected from the group consisting of —CHO and

In the conversion of the pseudotrisaccharide (II) to the seco-dialdehyde oxidation product (III), there occurs oxidative fission of the original pyranoside sugar moiety between the vicinal hydroxyl groups. Thus, when a starting pseudotrisaccharide possesses three vicinal hydroxyl groups, e.g., compounds of formula II wherein X is hydroxyl such as in gentamicins B and $B_1$, fission occurs at two places to produce a seco-dialdehyde of formula III wherein Y is —CHO together with formic acid.

The seco-dialdehyde intermediate represented by formula III as set forth hereinabove may exist in one or more acetal forms; accordingly, formula III is placed in brackets, it being understood that in this specification and in the claims, the term "seco-dialdehyde intermediate of formula III" includes the seco-dialdehyde structure set forth in formula III and any equivalent acetal or hydrated acetal form thereof.

In carrying out my process, it is not necessary to isolate or purify the seco-dialdehyde intermediate III. Thus, the reaction solution containing the seco-dialdehyde oxidation product is immediately treated with an excess of a metal borohydride (preferably sodium borohydride) until thin layer chromatographic analysis indicates the absence of starting seco-dialdehyde intermediate, and there is formed a solution containing a seco-dihydroxy-pseudotrisaccharide intermediate of this invention which is represented by the following formula IV:

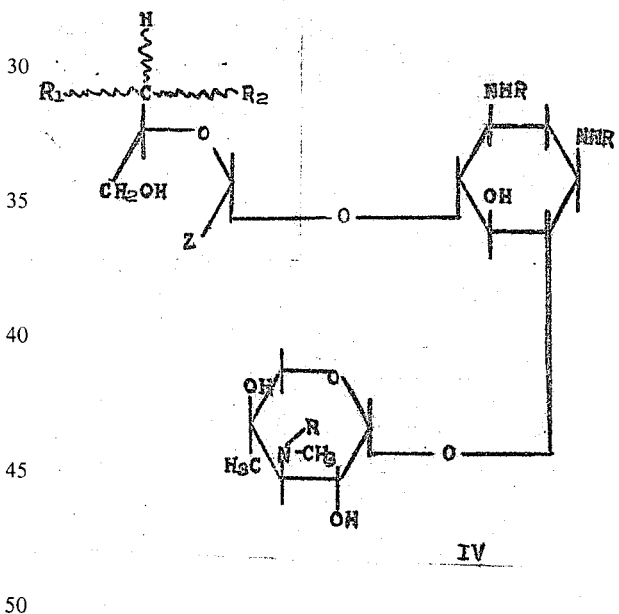

IV wherein R, $R_1$ and $R_2$ are as defined hereinabove for formulae I, II and III, and Z is a member selected from the group consisting of —$CH_2OH$ and

The seco-dihydroxy intermediates represented by formula IV exist in the form shown and may be isolated as such and represent the product aspect of the invention sought to be patented. Thus, if desired, a seco-dihydroxypseudotrisaccharide intermediate of formula IV may be isolated by adding sufficient hydrochloric acid to remove any excess sodium borohydride followed by evaporation of the neutral solution to a residue which may be purified utilizing known methods such as crystallization, extraction, and chromatographic techniques.

It is not necessary, however, to isolate or purify the seco-dihydroxypseudotrisaccharide of above formula IV prior to carrying out the last step of my process whereby the seco-dihydroxy sugar is cleaved from the garamine moiety in the seco-dihydroxypseudotrisaccharide of formula IV. Thus, after reduction of the seco-dialdehyde intermediate III with a metal borohydride to form a seco-dihydroxy intermediate IV, the reaction solution (usually in aqueous methanol) is treated with hydrochloric acid to about pH 1, and then stirred at room temperature until thin layer chromatographic analysis of an aliquot indicates the absence of starting compound and the presence of mainly 1,3,3'-tri-N-substituted garamine. Isolating of the resulting garamine derivative of formula I is conveniently effected by neutralizing the reaction solution, e.g., with solid sodium bicarbonate, concentrating the neutralized reaction mixture to a small volume, partitioning the residue between water and an organic solvent such as chloroform, separating the layers, then concentrating the organic solution to a residue comprising a 1,3,3'-tri-N-substituted garamine of formula I which may be purified utilizing known techniques such as extraction, crystallization and chromatography to obtain purified 1,3,3'-tri-N-substituted garamine in excellent yields.

When garamine is desired, the amino-protected garamine derivative of formula I may be deblocked by known methods, preferably alkaline hydrolysis.

Alternatively, the amino-protected seco-dihydroxypseudotrisaccharide compounds of formula IV may be deblocked utilizing conventional techniques such as by hydrogenation thereof in methanolic solution over palladium-charcoal catalyst when removing a carbobenzyloxy group followed by purification utilizing chromatographic techniques whereby is obtained a seco-dihydroxypseudotrisaccharide of formula IV wherein R is hydrogen. Such compounds may then be converted to other amino-protected derivatives for conversion to amino-protected garamine derivatives as discussed above and thence to other pseudotrisaccharides by methods disclosed in the aforementionend copending application Ser. No. 296,434, filed Oct. 10, 1972, and now abandoned.

A preferred species of my process as described hereinabove is that wherein carbobenzyloxy is the amino-protecting group in the pseudotrisaccharide starting compound; wherein the solvent is an aqueous lower alkanol, particularly aqueous methanol; wherein the glycol cleaving reagent is sodium meta-periodate and the metal borohydride is sodium borohydride. When my process is carried out under these preferred conditions a per-N-carbobenzyloxy aminoglycoside of formula II is converted to 1,3,3'-tri-N-carbobenzyloxygaramine in excellent yields which are greater than those obtained by the preferred species of the process claimed in my copending application Ser. No. 373,693, filed on even date as the instant application. Specifically, when a methanolic solution of 1,3,6',3''-tetra-N-carbobenzyloxygentamicin $B_1$ is treated according to the preferred species of my process as set forth in Example 1, there is obtained about a 97 percent theoretical yield of 1,3,3'-tri-N-carbobenzyloxygaramine from 1,3,6',3''-tetra-N-carbobenzyloxygentamicin $B_1$, whereas less than 30 percent yield of 1,3,3'-tri-N-acetylgaramine is obtained from 1,3,6',3''-tetra-N-acetylgentamicin $B_1$ when carried through the preferred method of the process of my copending application Ser. No. 373,693, filed concomitantly herewith, as disclosed in Example 1 of the instant application.

My process may be carried out starting with a mixture of pseudotrisaccharides comprising aminoglycosides possessing the requisite garamine and other pyranoside sugar having vicinal hydroxyl groups, as well as containing other compounds not possessing the requisite groups, and there will be produced 1,3,3'-tri-N-substituted-garamine which can be easily separated from the product mixture via chromatographic techniques. For example, a mixture of pseudotrisaccharides obtained as described in J. Chromatography, 70, 171 (1972) by removal of gentamicins A and C from the total antibiotic complex produced in the gentamicin fermentation by Micromonospora purpurea NRRL 2953 (said mixture comprising gentamicins B, $B_1$ and $X_2$ together with small quantities of gentamicins A and C) upon conversion to a per-amino-protected mixture (e.g., to a per-N-carbobenzyloxy-pseudotrisaccharide mixture comprising 1,3,6',3''-tetra-N-carbonbenzyloxygentamicin B, 1,3,6',3''-tetra-N-carbobenzyloxygentamicin $B_1$, 1,3,2',3''-tetra-N-carbobenzyloxygentamicin $X_2$ together with small quantities of 1,3,2',3''-tetra-N-carbobenzyloxygentamicin A and 1,3,2',6',3''-penta-N-carbobenzyloxygentamicin C) and treatment of the N-protected mixture according to the process of this invention, yields 1,3,3'-tri-N-substituted-garamine (e.g., 1,3,3'-tri-N-carbobenzyloxygaramine) in good yield, which is easily separated via chromatographic techniques from side products and residual nonreacting starting pseudotrisaccharides such as gentamicin C.

Similarly, Antibiotic JI-20 Complex (comprising JI-20A and JI-20B) which is produced in the fermentation by Micromonospora purpurea JI-20 (NRRL-5467) and isolated as described in copending application U.S. Ser. No. 261,753 filed June 12, 1972 and now abandoned discussed hereinabove, upon conversion to the per-N-carbobenzyloxy derivative thereof (i.e., to 1,3,2',6',3''-penta-N-carbobenzyloxyantibiotic JI-20 Complex) and treatment thereof with sodium meta-periodate followed by treatment of the seco-dialdehyde pseudotrisaccharide intermediates thereby produced with sodium borohydride and treatment of the resulting seco-dihydroxypseudotrisaccharide intermediates with hydrochloric acid yields 1,3,3'-N-carbobenzyloxygaramine.

My process is described in detail for aminoglycoside derivatives having carbobenzyloxy N-protecting groups, the preferred amino protecting group when carrying out the process of this invention. It is to be understood, however, that the process of this invention may also be carried out utilizing other amino-protecting groups such as acetyl, benzoyl, phenylacetyl, methoxycarbonyl, ethoxycarbonyl, and trichloroethoxycarbonyl and there will be obtained 1,3,3'-tri-N-substituted garamine in excellent yield.

Procedures are set forth hereinbelow to illustrate the best mode contemplated by applicant for carrying out my invention and are not to be construed as limiting the scope thereof, equivalents thereof which will be obvious to one skilled in the art, being considered as part of my invention.

PREPARATION 1

Per-N-Carbobenzyloxyaminoglycosides

A. 1,3,6',3''-Tetra-N-Carbobenzyloxygentamicin $B_1$

1. Add 9 g. of gentamicin $B_1$ to 32 ml. of saturated aqueous sodium bicarbonate in 60 ml. of water. While keeping the mixture cooled in an ice bath, add dropwise with stirring 15.48 g. of carbobenzyloxy chloride over a 30 minute period keeping the solution basic (pH 8–10) by addition of saturated aqueous sodium bicarbonate (final pH 9–10). Stir the reaction mixture at room temperature overnight, then decant the mixture and triturate the residue with ice water until it solidifies. Air dry the solid for 24 hours to obtain 15 g. of 1,3-,6',3''-tetra-N-carbobenzyloxygentamicin $B_1$. Thin layer chromatographic analysis on silica gel plates developed with the lower phase of a solvent mixture comprising chloroform, methanol, ammonium hydroxide (1:1:1), indicates one spot at the solvent front with no starting compound. B. In similar manner, treat each of the following aminoglycosides with benzyl chloroformate in aqueous sodium bicarbonate:

1. Gentamicin B
2. Gentamicin $X_2$
3. Antibiotic JI-20A
4. Antibiotic JI-20B
5. Antibiotic G-418

Isolate and purify each of the resultant respective products in a manner similar to that described hereinabove to obtain, respectively:

1. 1,3,6',3''-tetra-N-carbobenzyloxygentamicin B,
2. 1,3,2',3''-tetra-N-carbobenzyloxygentamicin $X_2$,
3. 1,3,2',6',3''-penta-N-carbobenzyloxyantibiotic JI-20A,
4. 1,3,2',6',3''-penta-N-carbobenzyloxyantibiotic JI-20B,
and
5. 1,3,2',3''-tetra-N-carbobenzyloxyantibiotic G-418.

PREPARATION 2

Per-N-Carboalkoxyaminoglycosides (Per-N-Alkoxycarbonylaminoglycosides)

A. 1,3,2',6',3''-Penta-N-carbomethoxyantibiotic JI-20B

Dissolve 0.9 g. of Antibiotic JI-20B (prepared as described in copending application U.S. Ser. No. 261,753 filed 6/12/72) and now abandoned in 10 ml. of water and add 2.7 g. of sodium carbonate followed by 30 ml. of acetone. To the stirred suspension, cooled to about 0°C, add dropwise a solution of 5 g. of methyl chloroformate in 10 ml. of toluene. Allow the reaction mixture to warm to room temperature and stir for 20 hours. Evaporate the solvent in vacuo to a residue comprising 1,3,2',6',3''-penta-N-carbomethoxyantibiotic JI-20B. Purify by chromatographing on silica gel, eluting with the lower phase of a 2:1:1 chloroform: isopropanol:21 percent ammonium hydroxide solvent system and monitoring fractions by thin layer chromatography. Combine like fractions containing penta-N-carbomethoxyantibiotic JI-20B and evaporate the combined fractions in vacuo to a residue comprising 1,3,2'-,6',3''-penta-N-carbomethoxyantibiotic JI-20B; m.p. 175°–180°C; $[\alpha]_D^{26} + 106°$ (water).

B. Other Per-N-Carbomethoxyaminoglycosides

In a similar manner, treat each of Antibiotic JI-20A, Antibiotic JI-20 complex, gentamicin B, gentamicin $B_1$, gentamicin $X_2$, and a mixture comprising gentamicins B, $B_1$ and $X_2$, and Antibiotic G-418 with methyl chloroformate. Isolate and purify each of the resultant products in a manner similar to that described to obtain, respectively, 1,3,2',6',3''-penta-N-carbomethoxyantibiotic JI-20A, 1,3,2',6',3''-penta-N-carbomethoxyantibiotic JI-20 complex, 1,3,6',3''-tetra-N-carbomethoxygentamicin B, 1,3,6',3''-tetra-N-carbomethoxygentamicin $B_1$, 1,3,2',3''-tetra-N-carbomethoxygentamicin $X_2$ and a product mixture comprising 1,3,6',3''-tetra-N-carbomethoxygentamicin B, 1,3,6',3''-tetra-N-carbomethoxygentamicin $B_1$ and 1,3,2',3''-tetra-N-carbomethoxygentamicin $X_2$, and 1,3,2',3''-tetra-N-carbomethoxyantibiotic G-418.

C. Other Per-N-Carboalkoxyaminoglycosides

By substituting equivalent quantities of ethyl chloroformate and 2,2,2-trichloroethyl chloroformate for methyl chloroformate in Preparations 2A and 2B, there are obtained the corresponding per-N-carboethoxy and per-N-carbo(2,2,2-trichloroethoxy) derivatives as follows:

1,3,2',6',3''-penta-N-carboethoxyantibiotic JI-20B,
1,3,2',6',3''-penta-N-carbo-(2,2,2-trichloroethoxy)antibiotic JI-20B,
1,3,2',6',3''-penta-N-carbo(2,2,2-trichloroethoxy)antibiotic JI-20A,
1,3,2',6',3''-penta-N-carbo(2,2,2-trichloroethoxy)antibiotic JI-20 complex, and
1,3,6',3''-tetra-N-carboethoxygentamicin B, and
1,3,6',3''-tetra-N-carbo(2,2,2-trichloroethoxy)gentamicin B,
1,3,6',3''-tetra-N-carbo(2,2,2-trichloroethoxy)gentamicin $B_1$,
1,3,2',3''-tetra-N-carboethoxygentamicin $X_2$ and
1,3,2',3''-tetra-N-carbo-(2,2,2-trichloroethoxy)gentamicin $X_2$,
product mixture comprising the tetra-N-carboethoxy derivatives of gentamicins B, $B_1$ and $X_2$, and
a product mixture comprising the tetra-N-carbo-(2,2,2-trichloroethoxy)gentamicins B, $B_1$ and $X_2$, and
1,3,2',3''-tetra-N-carboethoxyantibiotic G-418, and
1,3,2',3''-tetra-N-carbo-(2,2,2-trichloroethoxy)antibiotic G-418, respectively.

PREPARATION 3

Per-N-Lower Alkanoylaminoglycosides

A. 1,3,2',3''-tetra-N-acetylantibiotic G-418

To Antibiotic G-418 (2.0 g.) in methanol (100 ml.) add acetic anhydride (5 ml.), stir the reaction mixture at room temperature for 2.5 hours, concentrate the solution in vacuo, redissolve the resultant residue in methanol (20 ml), and add the methanol solution dropwise to 1 liter of anhydrous ether. Separate by filtration the resultant precipitate to obtain 2.5 g. of 1,3,2',3''-tetra-N-acetylantibiotic G-418 as a colorless solid, which upon thin layer chromatographic analysis on silica gel G.F. utilizing the lower phase of a chloroform:methanol:ammonium hydroxide (1:1:1) system as developing solvent, shows a single spot more mobile than Antibiotic G-418.

B. Per-N-Acetylgentamicins

In a manner similar to that described in Preparation 3A, treat each of gentamicin B, gentamicin $B_1$, gentamicin $X_2$ and a mixture comprising gentamicins B, $B_1$ and $X_2$ with acetic anhydride in methanol. Isolate and purify each of the resultant products in a manner similar to that described to obtain, respectively:

1,3,6',3''-tetra-N-acetylgentamicin B as the tetrahydrate; $[\alpha]_D^{26}$ + 119° (water), 1,3,6',3''-tetra-N-acetylgentamicin $B_1$ as the trihydrate; $[\alpha]_D^{26}$ + 134° (water), 1,3,2',3''-tetra-N-acetylgenamicin $X_2$, and a mixture comprising mainly 1,3,6',3''-tetra-N-acetylgentamicin B, 1,3,6',3''-tetra-N-acetylgentamicin $B_1$ and 1,3,2',3''-tetra-N-acetylgentamicin $X_2$.

C. 1,3,2',6',3''-Penta-N-Acetylantibiotic JI-20

1. 1,3,2',6',3''-penta-N-acetylantibiotic-JI-20 Complex

Dissolve 5 g. of Antibiotic JI-20 complex in 150 ml. of methanol and add 15 ml. of acetic anhydride. Keep the reaction mixture at room temperature for 16 hours, filter and pour the filtrate into 2.5 liters of stirred diethyl ether. Collect the resultant precipitate by filtration, wash with ether and dry in vacuo to obtain 1,3,2',6',3''-penta-N-acetylantibiotic JI-20 complex; m.p. 216°–224°C; $[\alpha]_D^{26}$ + 130° (water).

2. 1,3,2',6',3''-penta-N-acetylantibiotic JI-20A

Add 4 ml. of acetic anhydride dropwise to a stirred solution of 1 g. of Antibiotic JI-20A in 30 ml. of methanol at 5°C. Stir the reaction mixture at room temperature for 16 hours, concentrate to about one half volume in vacuo and add the concentrate dropwise to 50 ml. of stirred diethyl ether. Isolate the resultant precipitate by filtration, dissolve the precipitate in a minimum volume of aqueous methanol and chromatograph on a column of silica gel eluting with the lower phase of a chloroform:methanol:ammonium hydroxide (1:1:1) solvent system. Monitor fractions by thin layer chromatography, combine those fractions containing the desired product, concentrate the combined eluates to a residue comprising 1,3,2',6',3''-penta-N-acetylantibiotic JI-20A. Dissolve the residue in water and lyophilize to obtain a sample having m.p. 210°–220°C; $[\alpha]_D^{26}$ + 141° (water).

3. 1,3,2',6',3''-penta-N-acetylantibiotic JI-20B

In a manner similar to that described in Preparation 3C(1), treat 100 mg. of Antibiotic JI-20B in 3 ml. of methanol with 0.3 ml. of acetic anhydride. Isolate and purify the resultant product in a manner similar to that described to obtain 1,3,2',6',3''-penta-N-acetylantibiotic JI-20B, m.p. 220°–225°C; $[\alpha]_D^{26}$ + 124° (water).

D. In the procedures of Preparations 3A, 3B and 3C, other lower alkanoic acid anhydrides (e.g., caprylic acid anhydride, propionic acid anhydride) may be substituted for acetic anhydride and there will be formed the corresponding per-N-alkanoyl derivatives, e.g., the corresponding per-N-capryloyl and the per-N-propionyl derivatives of the compounds of Preparation 3A–3C, respectively.

PREPARATION 4

Per-N-Benzoylaminoglycosides

A. 1,3,6',3''-tetra-N-Benzoylgentamicin B

1. Dissolve 4.82 g. of gentamicin B in 250 ml. of dried pyridine, and cool to 0°C. Add with stirring 21.1 g. of benzoyl choride, and allow the reaction mixture to stand at room temperature for 24 hours. Evaporate the pyridine in vacuo, dissolve the resultant residue in 500 ml. of chloroform, wash the chloroform solution with aqueous sodium bicarbonate solution, 0.1N sulfuric acid and then saturated sodium chloride solution, dry the washed chloroform solution over sodium sulfate, filter, and evaporate to a residue. Dissolve the residue in 500 ml. of methanol, treat with a small quantity of sodium methoxide and allow to stand at room temperature for 24 hours. Evaporate the methanol solution in vacuo to a residue, then redissolve the residue in a minimum volume of methanol and add the methanolic solution to a large volume of stirred ether. Filter and dry the resultant precipitate comprising 1,3,6',3''-tetra-N-benzoylgentamicin B.

B. In a similar manner, treat each of the following with benzoyl chloride in pyridine at 0°C followed by sodium methoxide in methanol; gentamicin $B_1$, gentamicin $X_2$, a mixture comprising gentamicins B, $B_1$ and $X_2$, Antibiotic G-418, Antibiotic JI-20A, Antibiotic JI-20B, and Antibiotic JI-20 complex.

Isolate and purify each of the resultant products in a manner similar to tha described hereinabove to obtain respectively 1,3,6',3''-tetra-N-benzoylgentamicin $B_1$; 1,3,2',3''-tetra-N-benzoylgentamicin $X_2$; a product mixture comprising tetra-N-benzoylgentamicins B, $B_1$ and $X_2$; 1,3,2',3''-tetra-N-benzoylantibiotic G-418; 1,3,2',6',3''-penta-N-benzoylantibiotic JI-20A; 1,3,2',6',3''-penta-N-benzoylantibiotic JI-20B; 1,3,2',6',3''-penta-N-benzoylantibiotic JI-20 complex.

EXAMPLE 1

Preparation of 1,3,3'-tri-N-carbonbenzyloxygaramine from 1,3,6',3''-tetra-N-carbobenzyloxygentamicin $B_1$ A. Periodate oxidation To a stirred solution of 1 g. of 1,3,6',3''-tetra-N-carbobenzyloxygentamicin $B_1$ in 50 ml. of methanol at 0°C, add 0.8988 g. of sodium meta-periodate. Stir the solution for 3 hours, then add ethylene glycol dropwise until the solution gives a negative starch iodide test. Remove the resultant inorganic precipitate by filtration to yield a filtrate containing the secodialdehyde periodate oxidation product of 1,3,6',3''-tetra-N-carbobenzyloxygentamicin $B_1$ represented by the following formula IA:

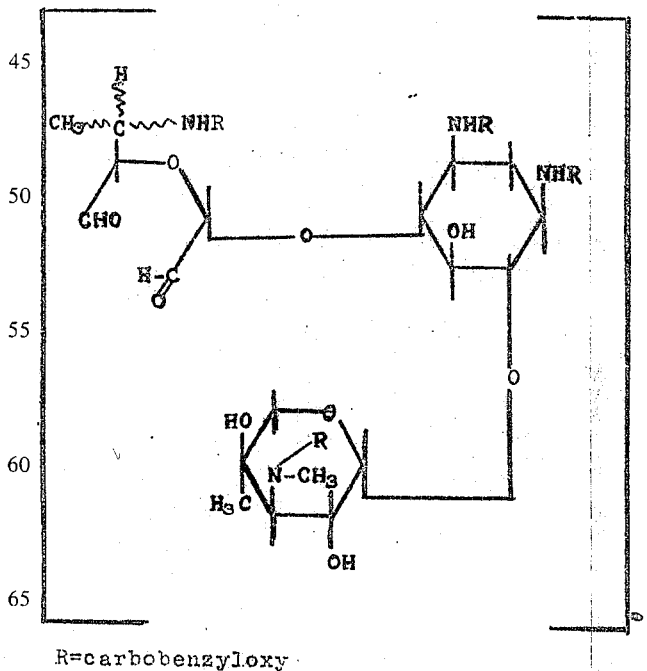

R = carbobenzyloxy

IA

B. Sodium borohydride reduction

1. Add 0.3 g. of sodium borohydride to the filtrate containing the periodate oxidation product prepared in Example 1A and stir the reaction mixture overnight at room temperature to obtain a solution containing the seco-dihydroxy intermediate of 1,3,6',3''-tetra-N-carbobenzyloxygentamicin $B_1$ represented by the following formula IB:

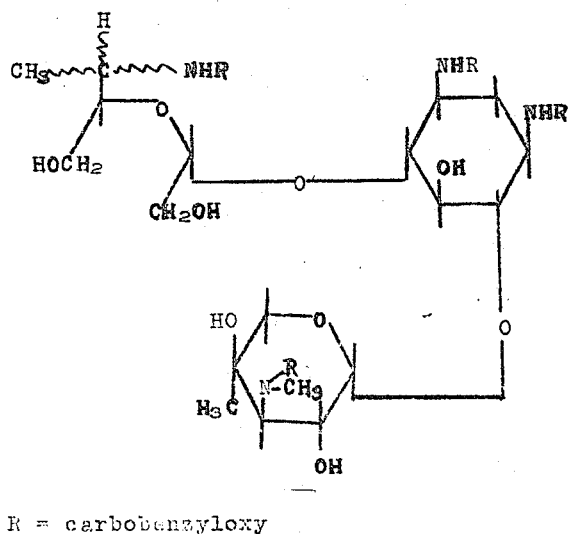

R = carbobenzyloxy     IB

2. Alternatively, the compound of this Example is prepared as follows. Dissolve 1 g. of 1,3,6',3''-tetra-N-carbobenzyloxygentamicin $B_1$ in 25 ml. of methanol:-water, add 0.45 g. of sodium meta-periodate and allow the reaction mixture to stir at room temperature for two days. Add ethylene glycol dropwise until the solution gives a negative starch-iodide test, then stir the mixture for 30 minutes, filter and evaporate the filtrate to a residue comprising the seco-dialdehyde derivative of Example 1A. Dissolve this residue in 15 ml. of methoxyethanol, cool to 0°C, and add 90 mg. of sodium borohydride with stirring. Continue stirring for 30 minutes, then evaporate in vacuo and dissolve the resultant residue in chloroform. Wash the chloroform solution with saturated aqueous sodium bicarbonate, dry the chloroform solution over magnesium sulfate and evaporate in vacuo to a residue comprising the per-N-carbobenzyloxy-seco-dihydroxy compound of Example 1B(1) as an amorphous solid; yield 0.79 g.

Removal of the carbobenzyloxy groups to obtain a compound of formula IB wherein R is hydrogen is carried out as follows: Dissolve 0.7 g. of the seco-dihydroxy product in 50 ml. of methanol and hydrogenate the methanolic solution over 10 percent palladium-charcoal catalyst for two days at 50 psi. Filter off the palladium-charcoal catalyst, evaporate the solvent, and chromatograph the resultant residue over silica gel (10 g.) using the lower phase of a 2:1:1 chloroform:methanol:10 percent ammonium hydroxide solvent system as eluant. Monitor the fractions by thin layer chromatography and combine those fractions containing the compound represented by formula IB wherein R is hydrogen. Evaporate the combined fractions to obtain 4-O-1'-[1'-(3''(R)-amino-1''-hydroxy-2''-butoxy)-2'-hydroxyethyl]garamine as a white amorphous foam; yield = 0.16 g. mass spectrum: m/e 469 (M+1)+; N.M.R: δ 5.01 (doublet, J=3.5$H_z$ (H, H-1''), δ 5.03 (triplet, J=8$H_z$, 1H, H-1'), δ 4.3–2.8 (complex); δ 2.60 (singlet, 3H, N—$CH_3$), δ 1.9 (complex, 2H, 2xH-2), δ 1.18 (singlet, 3H, C—$CH_3$), δ 1.06 (doublet, J=6.5$H_z$, 3H, CH—$CH_3$) ppm.

C. 1,3,3'-Tri-N-carbobenzyloxygaramine

Add 6N hydrochloric acid to the solution containing the seco-dihydroxy intermediate prepared in Example 1B(1) until the solution is at about pH 1, then stir at room temperature until a thin layer chromatographic analysis of an aliquot of the reaction solution on silica gel utilizing as developing solvent a mixture of chloroform, methanol, 15 percent ammonium hydroxide (1:1:1) indicates the presence of mainly 1,3,3'-tri-N-carbobenzyloxygaramine. Neutralize the reaction mixture with solid sodium bicarbonate and concentrate in vacuo; add water and chloroform to the resultant residue, separate the solvent layers, dry the chloroform layer over sodium sulfate, filter and concentrate in vacuo to a residue comprising 0.75 g. (97 percent theory) of 1,3,3'-tri-N-carbobenzyloxygaramine; m.p. 104°–112°C; $[\alpha]_D^{26}$ + 99.6° (ethanol).

EXAMPLE 2

Preparation of 1,3,3'-Tri-N-Carbobenzyloxygaramine from a gentamicin mixture comprising gentamicin B, gentamicin $B_1$ and gentamicin $X_2$ A. Mixture of tetra-N-carbobenzyloxygentamicin B, $B_1$ and $X_2$ 1. Utilizing known procedures (J. Chromatograph, 70, 171–173 (1972)), remove gentamicin C and gentamicin A from the antibiotic complex produced in the gentamicin fermentation by Micromonospora purpurea NRRL 2953 to obtain a product mixture comprising gentamicin B, gentamicin $B_1$ and gentamicin $X_2$ together with small quantities of gentamicins A and C and other minor components.

2. To 10 g. of the product mixture comprising gentamicin B, gentamicin $B_1$ and gentamicin $X_2$ together with small quantities of gentamicins A and C and other minor components in 40 ml. of methanol, add 250 ml. of water and 10 ml. of saturated aqueous sodium bicarbonate. Cool the mixture in an ice bath and, over a 30 minute period, add dropwise 17.06 g. of carbobenzyloxy chloride keeping the solution at a pH in the range of 8 – 10 by adding saturated aqueous sodium bicarbonate solution (final pH ca 9). Stir for 16 hours. Decant the liquid phase and triturate the residue with water until it solidifies. Separate the solid from teh water washes and dry at 45°C over phosphorus pentoxide in vacuo for 24 hours to give 12.9 g. of a mixture comprising mainly 1,3,6',3''-tetra-N-carbobenzyloxygentamicin B, 1,3,6',3''-tetra-N-carbobenzyloxygentamicin $B_1$ and 1,3,2',3''-tetra-N-carbobenzyloxygentamicin $X_2$. Thin layer chromatographic analysis of the product on silica gel G.F. developed with the lower phase of a solvent mixture comprising chloroform, methanol, ammonium hydroxide (1:1:1) indicates one spot at the solvent front with no starting compound.

B. Periodate oxidation

To a stirred solution of 5 g. of the product mixture comprising mainly tetra-N-carbobenzyloxygentamicins B, B₁ and X₂ obtained in Example 2A in 500 ml. of methanol at 0°C, add 4.50 g. of sodium meta-periodate. Stir the solution overnight at room temperature, then add ethylene glycol dropwise until the solution gives a negative starch iodide test. Remove any inorganic precipitate by filtration to give a filtrate containing the seco-dialdehyde derivative of formula 1A together with the corresponding seco-dialdehyde derivatives of gentamicins B and X₂ represented by the following structural formulae (2B(1) and 2B(2)) wherein R is carbobenzyloxy and Z represents the 4-O-linked-tri-N-carbobenzyloxygaramine residue:

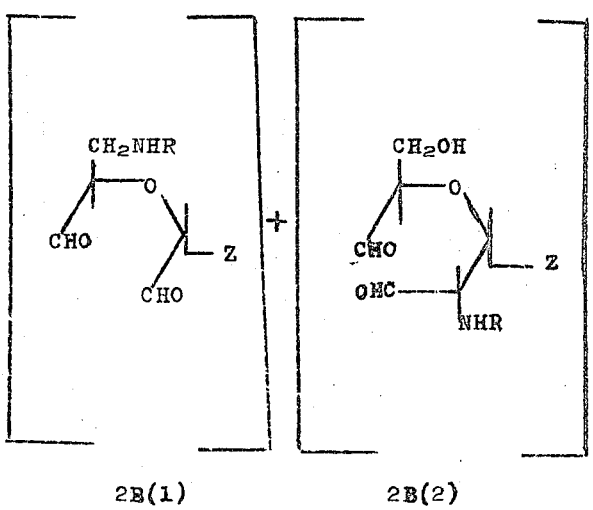

2B(1)     2B(2)

C. Sodium Borohydride Reduction

Add 1.5 g. of sodium borohydride to the filtrate containing the mixture of periodate oxidation products prepared in Example 2B. Stir the reaction mixture at room temperature for three days to obtain a solution comprising a mixture of seco-dihydroxy intermediates represented by the following structural formulae (2C(1) and 2C(2)) wherein R is carbobenzyloxy, R₁ is hydrogen or methyl and Z represents the 4-O-linked-tri-N-carbobenzyloxygaramine residue:

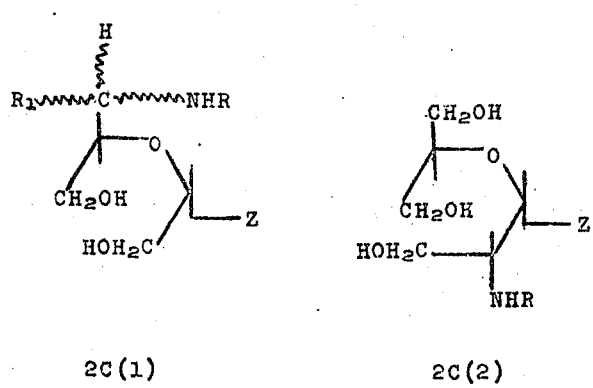

2C(1)     2C(2)

D. 1,3,3'-tri-N-Carbobenzyloxygaramine

To the solution of the seco-dihydroxy product mixtures prepared as described in Example 2C, add 6N hydrochloric acid until the solution is at pH 1. Stir the solution at room temperature for eight days, monitoring aliquots of the reaction mixture via thin layer chromatography on silica gel plates developed with 10 percent methanol in chloroform. After analysis indicates the presence of mainly tri-N-carbobenzyloxygaramine together with a more mobile material, neutralize the reaction mixture with solid sodium bicarbonate and concentrate to a residue. Triturate the residue with water until the washings are neutral, dissolve the washed residue in chloroform, dry over sodium sulfate, filter and concentrate in vacuo to a residue comprising mainly 1,3,3-tri-N-carbobenzyloxygaramine (yield, 4.7 g.).

Purify by chromatographing on a column (2.5 × 120 cm.) filled with silica gel (200 g. - Baker) previously conditioned by contact with 5 percent methanol in chloroform. Dissolve the 4.7 g. of 1,3,3'-tri-N-carbobenzyloxygaramine prepared as described above in a minimum volume of 5 percent methanol in chloroform and apply to the column. Elute the column with 10 percent methanol in chloroform at a flow rate of 1 ml. per minute, collecting 6 ml. fractions. Monitor the effluent by thin layer chromatography on silica plates (250 microns), developed with 10 percent methanol in chloroform. Collect like fractions to obtain 1,3,3'-tri-N-carbobenzyloxygaramine (yield 1.8 g.).

EXAMPLE 3

Preparation of 1,3,3'-Tri-N-Carbobenzyloxygaramine From Penta-N-Carbobenzyloxyantibiotic JI-20A A. Periodate Oxidation of Penta-N-Carbobenzyloxyantibiotic JI-20A In a manner similar to that described in Example 1A, treat a sample of 1,3,2',6',3''-penta-N-carbobenzyloxyantibiotic JI-20A in methanol at 0°C with sodium meta-periodate until thin layer chromatographic analysis of an aliquot of the reaction solution indicates the absence of starting compound. Add ethylene glycol dropwise until the solution gives a negative starchiodide test. Remove any inorganic precipitate by filtration to yield a filtrate containing the seco-dialdehyde derivative of 1,3,2',6',3''-penta-N-carbobenzyloxyantibiotic JI-20A represented by the following formula 3A wherein R is carbobenzyloxy and Z represents the 4-O-linked-tri-N-carbobenzyloxygaramine residue:

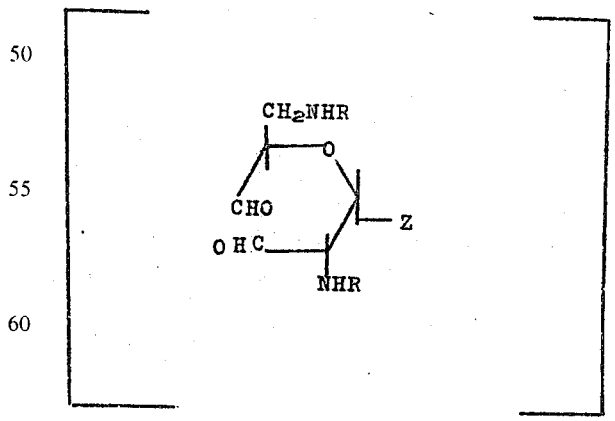

3A

B. Sodium Borohydride Reduction

In a manner similar to that described in Example 1B, treat the filtrate containing the seco-dialdehyde periodate oxidation product prepared in Example 3A with sodium borohydride and stir the reaction mixture at room temperature until thin layer chromatographic analysis of an aliquot indicates the absence of seco-diladehyde starting compound, whereby is obtained a solution containing the seco-dihydroxy derivative of penta-N-carbobenzyloxyantibiotic JI-20A represented by the following formula 3B wherein R is carbobenzyloxy and Z is the 4-O-linked-tri-N-carbobenzyloxygaramine residue:

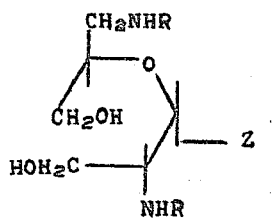

C. 1,3,3'-Tri-N-Carbobenzyloxygaramine

In a manner similar to that described in Example 1C, add 6N hydrochloric acid to the solution containing the seco-dihydroxy intermediate prepared in Example 3B until the solution is at about pH 1. Stir at room temperature until thin layer chromatographic analysis of an aliquot of the reaction solution indicates the presence of mainly 1,3,3'-tri-N-carbobenzyloxygaramine. Isolate and purify the resultant product in a manner similar to that described in Example 1C to obtain 1,3,3'-tri-N-carbobenzyloxygaramine.

EXAMPLE 4

Preparation of 1,3,3'-Tri-N-Carbobenzyloxygaramine From Penta-N-Carbobenzyloxyantibiotic JI-20B A. Periodate Oxidation of Penta-N-Carbobenzyloxyantibiotic JI-20B In a manner similar to that described in Example 1A, treat a sample of 1,3,2',6',3''-penta-N-carbobenzyloxyantibiotic-JI-20B in methanol at 0°C with sodium meta-periodate, then with ethylene glycol, followed by filtration to obtain a filtrate containing the seco-dialdehyde derivative of 1,3,2',6',3''-penta-N-carbobenzyloxyantibiotic JI-20B represented by the following formula 4A wherein R is carbobenzyloxy and Z represents the 4-O-linked-tri-N-carbobenzyloxygaramine residue:

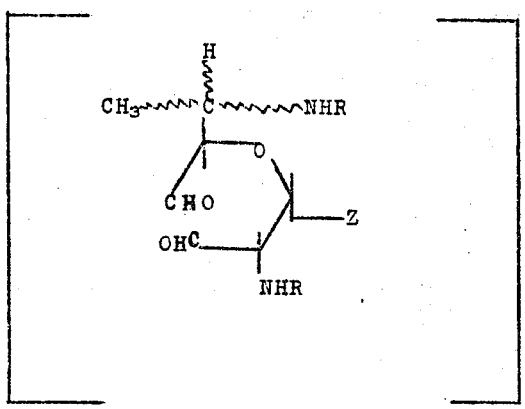

4A

B. Sodium Borohydride Reduction

Treat the filtrate containing the seco-dialdehyde periodate oxidation product prepared in above Example 4A with sodium borohydride in a manner similar to that described in Example 1B to obtain a solution containing the seco-dihydroxy derivative of penta-N-carbobenzyloxyantibiotic JI-20B represented by the following formula 4B wherein R is carbobenzyloxy and Z represents the 4-O-linked-tri-N-carbobenzyloxygaramine residue:

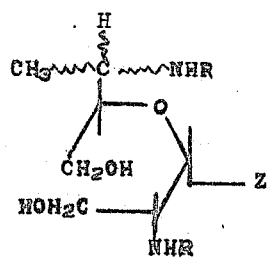

C. 1,3,3'-Tri-N-Carbobenzyloxygaramine

Treat the solution containing the seco-dihydroxy intermediate prepared in Example 4B with 6N hydrochloric acid in a manner similar to that described in Example 1C. Isolate and purify the resultant product in a manner similar to that described in Example 1C to obtain 1,3,3'-tri-N-carbobenzyloxygaramine.

EXAMPLE 5

Preparation of 1,3,3'-Tri-N-Carbobenzyloxygaramine From Antibiotic JI-20 Complex A. 1,3,2',6',3''Penta-N-Carbobenzyloxyantibiotic JI-20 Complex Dissolve 1.05 g. of Antibiotic JI-20 complex (comprising Antibiotic JI-20A, Antibiotic JI-20B and smaller amounts of gentamicin $C_1$, $C_2$ and $C_{1a}$, prepared as described in copending application U.S. Ser. No. 261,753 filed 6/12/72) and now abandoned and 0.5 g. of sodium carbonate in 25 ml. of water. Add 4 ml. of benzyl chhloroformate and stir overnight at room temperature. Isolate the resultant cystalline product by filtration, triturate the crystalline product with water, isolate the solids by filtration. Air dry to obtain 1,3,2',6',3''-penta-N-carbobenzyloxyantibiotic JI-20 complex. Purify by suspending the crude product in 50 ml. of a 4:1 mixture of hexane and diethyl ether. Stir for two hours, then isolate by filtration. Repeat the foregoing hexane-ether slurry, filter and wash the solid residue with hexane, and dry in vacuo to obtain 1,3,2',6',3''-penta-N-carbobenzyloxyantibiotic JI-20 complex; m.p. 245°–248°C.

B. Seco-Dialdehyde Derivative of Penta-N-Carbobenzyloxyantibiotic JI-20 Complex

1. In a manner similar to that described in Example 1A, treat 1,3,2',6',3''-penta-N-carbobenzyloxyantibiotic JI-20 complex with sodium meta-periodate in methanol, then with ethylene glycol. Remove any inorganic precipitate by filtration to yield a filtrate containing a seco-dialdehyde periodate oxidation mixture comprising the compounds of Examples 3A and 4A (represented by formulae 3A and 4A).

2. Alternatively, the intermediate of this example is prepared as follows: To 1 g. of 1,3,2',6',3''-penta-N- carbobenzyloxyantibiotic JI-20 complex in 30 ml. of methanol, add a solution of 460 mg. of sodium meta-periodate in 10 ml. of water and stir at room temperature for 48 hours. Separate the resultant inorganic precipitate by filtration and add an additional 460 mg. of sodium meta-periodate in 5 ml. of water. Stir for 5 days, separate the inorganic precipitate by filtration, then concentrate the filtrate to remove the methanol solvent, dilute the resultant residue with water and extract with chloroform. Wash the chloroform extracts with water and concentrate in vacuo to a residue comprising a seco-dialdehyde oxidation product mixture containing the compounds of Examples 3A and 4A (formulae 3A and 4A).

C. Sodium Borohydride Reduction

1. In a manner similar to that described in Example 1B, treat the filtrate containing the seco-dialdehyde periodate oxidation product mixture prepared in Example 5B(1) with sodium borohydride, whereby is obtained a solution containing a seco-dihydroxy product mixture comprising the compounds of Examples 3B and 4B, represented by formulae 3B and 4B.

2. Alternatively, dissolve 5.0 g. of the seco-dialdehyde product mixture obtained as described in above Example 5B(2) in 75 ml. of methanol, cool the solution to about 0°C and add 3 g. of sodium borohydride portionwise with stirring. Adjust the pH to about 6–7 by addition of 2N hydrochloric acid. Concentrate the reaction mixture in vacuo to a residue, triturate the residue with methanol, filter, and concentrate the filtrate to a residue comprising a seco-dihydroxy product mixture containing the compounds of Examples 3B and 4B (formulae 3B and 4B).

D. 1,3,3'Tri-N-Carbobenzyloxygaramine

1. In a manner similar to that described in Example 1C, treat the solution containing the seco-dihydroxy intermediate prepared in above Examples 5C(1) with hydrochloric acid. Isolate and purify the resultant product in a manner similar to that described to obtain 1,3,-3'-tri-N-carbobenzyloxygaramine.

2. Alternatively, dissolve the solid seco-dihydroxy product mixture obtained as described in Example 5C(2) in 50 ml. of water, add 2N hydrochloric acid until the reaction solution is about pH 1, and allow the reaction mixture to stand at room temperature until thin layer chromatographic analysis of an aliquot of the reaction mixture indicates 1,3,3'-tri-N-carbobenzyloxygaramine is the major component. Isolate the resultant product in a manner similar to that described in Example 1C to obtain 1,3,3'-tri-N-carbobenzyloxygaramine.

EXAMPLE 6

Preparation of 1,3,3'-Tri-N-Carbobenzyloxygaramine From Tetra-N-Carbobenzyloxyantibiotic G-418

A. In a manner similar to that described in Example 1A, treat 1,3,2',3''-tetra-N-carbobenzyloxyantibiotic G-418 in methanol at 0°C with sodium meta-periodate then with ethylene glycol. Filter the reaction solution to yield a filtrate containing the seco-dialdehyde derivative of 1,3,2',3''-tetra-N-carbobenzyloxyantibiotic G-418 represented by the following formula 6A wherein R is carbobenzyloxy and Z is the 4-O-linked-tri-N-carbobenzyloxygaramine residue:

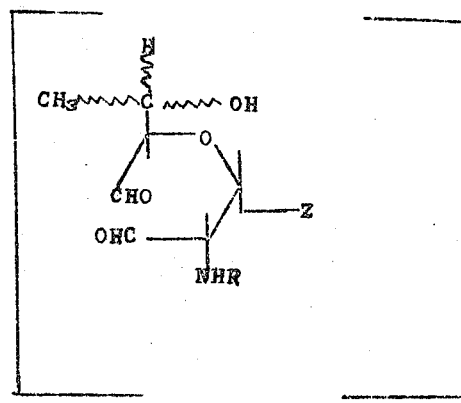

6A

B. In a manner similar to that described in Example 1B, treat the methanolic solution containing the seco-dialdehyde periodate oxidation product of 1,3,2',3''-tetra-N-carbobenzyloxyantibiotic G-418 obtained as described in Example 6A with sodium borohydride at room temperature whereby is obtained a methanolic solution containing the seco-dihydroxy derivative of 1,3,2',3''-tetra-N-carbobenzyloxyantibiotic G-418 represented by the following formula 6B wherein R is carbobenzyloxy and Z is the 4-O-linked-tri-N-carbobenzyloxygaramine residue:

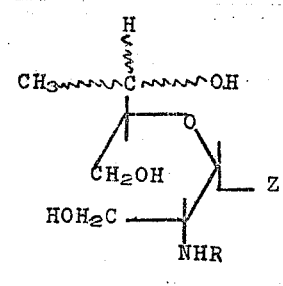

6B

C. In a manner similar to that described in Example 1C, treat the methanolic solution containing the seco-dihydroxy Antibiotic G-418 intermediate prepared as described in Example 6B with hydrochloric acid. Isolate and purify the resultant product in a manner similar to that described to obtain 1,3,3'-tri-N-carbobenzyloxygaramine.

EXAMPLE 7

Preparation of 1,3,3'-Tri-N-Carboalkoxygaramine from Penta-N-Carboalkoxyantibiotics JI-20B, JI-20A and JI-20 Complex A. Seco-dialdehyde Derivative of penta-N-carbomethoxyantibiotic JI-20B 1. Add 3.2 g. of sodium meta-periodate with stirring to a solution of 1.58 g. of 1,3,2',6',3''-penta-N-carbomethoxyantibiotic JI-20B in 100 ml. of 50 percent aqueous methanol. Stir the mixture at room temperature for three hours, then add about 2 ml. of ethylene glycol, stir for two hours, remove the precipitate by filtration and concentrate the filtrate in vacuo to a residue. Triturate the residue with methanol, filter, and concentrate the filtrate to a residue comprising the seco-dialdehyde derivative of 1,3,2',6',3''-penta-N- carbomethoxyantibiotic JI-20B, represented by formula 4A (Example 4A) wherein R is carbomethoxy and Z represents the 4-O-linked-tri-N-carbomethoxygaramine residue.

2. In the procedure of Example 7A(1), by using 1,3,-2',6',3''-penta-N-carbomethoxyantibiotic JI-20A as starting compound, there is obtained the seco-dialdehyde derivative of penta-N-carbomethoxyantibiotic JI-20A represented by formula 3A wherein R is carbomethoxy and Z represents the 4-O-linked-tri-N-carbomethoxygaramine residue.

3. Similarly, in procedure 7A(1), by substituting penta-N-carbomethoxyantibiotic JI-20 complex for penta-N-carbomethoxyantibiotic JI-20B as starting compound, there is obtained a seco-dialdehyde product mixture comprising the seco-dialdehyde derivatives obtained in both Examples 7A(1) and 7A(2).

4. Alternatively, in the procedure of Example 7A(1), by substituting for the penta-N-carbomethoxyantibiotic JI-20B starting compound, other per-N-carboalkoxyamino-protected derivatives of Antibiotic JI-20B, e.g., 1,3,2',6',3''-penta-N-carboethoxyantibiotic JI-20B and 1,3,2',6',3''-penta-N-carbo-(2,2,2-trichloroethoxy)antibiotic JI-20B, there is obtained the corresponding seco-dialdehyde periodate oxidation product comprising the seco-dialdehyde derivatives of 1,3,2',6',3''-penta-N-carboethoxyantibiotic JI-20B, and of 1,3,2',6',3''-penta-N-carbo-(2,2,2-trichloroethoxy)-antibiotic JI-20B, respectively, each represented by the formula 4A wherein R is carboethoxy and carbo-(2,2,2-trichloroethoxy), respectively, and Z represents the 4-O-linked-tri-N-carboethoxygaramine residue or the 4-O-linked-tri-N-carbo-(2,2,2-trichloroethoxy)garamine residue, respectively.

B. Seco-Dihydroxy Derivative of Penta-N-Carbomethoxyantibiotic JI-20B

1. Dissolve 3.4 g. of the seco-dialdehyde derivative of 1,3,2',6',3''-penta-N-carbomethoxyantibiotic JI-20B (prepared as described in Example 7A(1)) in 75 ml. of methanol, cool to 5°10°C and add 3 g. of sodium borohydride portionwise with stirring. Stir the reaction mixture at room temperature for five hours, adjust the pH to about 6–7 by addition of 2N hydrochloric acid, concentrate in vacuo to a residue. Triturate the residue with methanol, filter, and concentrate the filtrate to a residue comprising the seco-dihydroxy derivative of 1,-3,2',6',3''-penta-N-carbomethoxyantibiotic JI-20B represented by formula 4A wherein R is carbomethoxy and X represents the 4-O-linked-tri-N-carbomethoxygaramine residue.

2. In similar manner, treat the seco-dialdehyde derivative of 1,3,2',6',3''-penta-N-carbomethoxyantibiotic JI-20A with sodium borohydride in methanol. Isolate the resultant product in a manner similar to that described in Example 7B(1) to obtain the seco-dihydroxy derivative of 1,3,2',6',3''-penta-N-carbomethoxyantibiotic JI-20A represented by formula 3B wherein R is carbomethoxy and Z represents the 4-O-linked tri-N-carbomethoxygaramine residue.

3. Similarly, treat the seco-dialdehyde derivative of 1,3,2',6',3''-penta-N-carbomethoxyantibiotic JI-20 complex with sodium borohydride in methanol. Isolate the resultant product in a manner similar to that described whereby is obtained a product mixture comprising the seco-dihydroxy derivative of 1,3,2',6',3''-penta-N-carbomethoxyantibiotic JI-20 complex containing the compounds of formulae 3B and 4B wherein R is carbomethoxy and Z represents the 4-O-linked tri-N-carbomethoxygaramine residue.

4. In the procedure described in Example 7B(1), by substituting for the seco-dialdehyde derivative of 1,3,2'-,6',3''-penta-N-carbomethoxyantibiotic JI-20B, other amino-protected derivatives thereof, there are obtained the corresponding N-protected Antibiotic JI-20B seco-dialdehyde oxidation products; thus, upon reaction of the seco-dialdehyde derivatives of 1,3,2',6'-,3''-penta-N-carboethoxyantibiotic JI-20B and of 1,3,-2',6',3''-penta-N-carbo-(2,2,2-trichloroethoxy)antibiotic JI-20B, there are obtained the corresponding seco-dihydroxy intermediates, i.e., the seco-dihydroxy derivatives of 1,3,2',6',3''-penta-N-carboethoxyantibiotic JI-20B and of 1,3,2',6',3''-penta-N-carbo-(2,2,2-trichloroethoxy)antibiotic JI-20B, respectively, which are compounds represented by formula 4B wherein R is carboethoxy and carbo-(2,2,2-trichloroethoxy), respectively; and Z represents the 4-O-linked-tri-N-carboethoxygaramine residue, and the 4-O-linked-tri-N-carbo-(2,2,2-trichloroethoxy)garamine residue, respectively.

C. 1,3,3'-Tri-N-Carboalkoxygaramine

1. Dissolve the seco-dihydroxy derivative of 1,3,2',6-',3''-penta-N-carbomethoxyantibiotic JI-20B prepared in Example 7B(1) in 50 ml. of water and add 2N hydrochloric acid until the reaction solution is at about pH 1. Allow the mixture to stand at room temperature until thin layer chromatographic analysis of an aliquot of the reaction mixture indicates 1,3,3'-tri-N-carbomethoxygaramine is the major product. Evaporate the reaction solution in vacuo, chromatograph the resultant residue on silica gel, eluting with the lower phase of a 2:1:1 chloroform:isopropanol:ammonium hydroxide solvent system, combine the like fractions of tri-N-carbomethoxygaramine as determined by thin layer chromatography, and evaporate in vacuo to a residue comprising 1,3,3'-tri-N-carbomethoxygaramine.

2. Similarly, treat each of the seco-dihydroxy derivatives of 1,3,2',6',3''-penta-N-carbomethoxyantibiotic JI-20A and 1,3,2',6',3''-penta-N-carbomethoxyantibiotic JI-20 complex with 2N hydrochloric acid in the manner described in Example 7C(1) to obtain 1,3,3'-tri-N-carbomethoxygaramine.

3. Similarly, treat each of the seco-dihydroxy derivatives of 1,3,2',6',3''-penta-N-carboethoxyantibiotic JI-20B and 1,3,2',6',3''-penta-N-carbo-(2,2,2-trichloroethoxy)antibiotic JI-20B with hydrochloric acid in the manner of Example 7C(1) to obtain 1,3,3'-tri-N-carboethoxygaramine and 1,3,3'-tri-N-carbo-(2,2,2-trichloroethoxy)antibiotic JI-20B, respectively.

D. Alternatively, 1,3,3'-tri-N-carbomethoxygaramine is prepared without isolating any of the intermediates as follows: Treat 1,3,2',6',3''-penta-N-carbomethoxyantibiotic JI-20B in methanol with sodium periodate in the manner of Example 1A followed by treatment with ethylene glycol. Treat the thereby obtained methanolic solution of the seco-dialdehyde derivative of 1,3,2',6',3''-penta-N-carbomethoxyantibiotic JI-20B with sodium borohydride in the manner described in Example 1B, and thence treat the resulting methanolic solution containing the seco-dihydroxy intermediate of 1,3,2',6',3''-penta-N-carbomethoxyantibiotic JI-20B with hydrochloric acid in the manner described in Example 1C whereby is obtained 1,3,3'-tri-N-carbomethoxygaramine.

EXAMPLE 8

Preparation of 1,3,3'-Tri-N-Carbomethoxygaramine From Tetra-N-Carbomethoxygentamicins B, $B_1$, $X_2$ and Mixtures Thereof A. In a manner similar to that described in Example 1A, treat each of 1,3,6',3''-tetra-N-carbomethoxygentamicin B, 1,3,6',3''-tetra-N-carbomethoxygentamicin $B_1$, 1,3,2',3''-tetra-N-carbomethoxygentamicin $X_2$, and a mixture of tetra-N-carbomethoxygentamicins B, $B_1$, and $X_2$ in methanol with sodium meta-periodate followed by treatment with ethylene glycol and thence removal of any inorganic precipitate by filtration, to obtain the seco-dialdehyde derivative of 1,3,6',3''-tetra-N-carbomethoxygentamicin B, 1,3,6',3''-tetra-N-carbomethoxygentamicin $B_1$, 1,3,2',3''-tetra-N-carbomethoxygentamicin $X_2$, and a product mixture comprising the seco-dialdehyde derivatives of tetra-N-carbomethoxygentamicins B, $B_1$, and $X_2$, respectively, which are represented by the formulae 2B(1), 1A, 2B(2), respectively, and a mixture thereof, wherein R is carbomethoxy and Z is the 4-O-linked-tri-N-carbomethoxygaramine residue.

B. In a manner similar to that described in Examples 1B and 2C, add sodium borohydride to each of the filtrates containing the seco-dialdehyde derivatives prepared in Example 8A and stir each of the reaction mixtures at room temperature until thin layer chromatographic analysis of aliquots of the reaction mixtures indicates the absence of starting seco-dialdehyde derivative, whereby is obtained, in each instance, a solution containing the corresponding seco-dihydroxy derivatives represented by the formulae 2C(1) wherein $R_1$ is hydrogen, 1B, and 2C(2), respectively, and a mixture thereof, wherein R is carbomethoxy and Z is the 4-O-linked-tri-N-carbomethoxygaramine residue.

C. 1,3,3-Tri-N-Carbomethoxygaramine

In a manner similar to that described in Examples 1C and 2D, treat each of the solutions containing the seco-dihydroxy derivatives of tetra-N-carbomethoxygentamicins B, $B_1$ and $X_2$ and a mixture thereof prepared as described in Example 8B with 6N hydrochloric acid. Isolate each of the resultant products in a manner similar to that described in Examples 1C and 2D to obtain 1,3,3'-tri-N-carbomethoxygaramine.

EXAMPLE 9

Preparation of 1,3,3'-Tri-N-Acetylgaramine From Tetra-N-Acetylantibiotic G-418

A. Periodate Oxidation of Tetra-N-acetylantibiotic G-418

To a stirred solution of 1 g. of 1,3,2',3''-tetra-N-acetylantibiotic G-418 in 100 ml. of methanol:water (1:1) add 1 equivalent of sodium meta-periodate (0.321 g.). Stir the solution until a thin layer chromatographic analysis of an aliquot shows the absence of starting material. Add ethylene glycol dropwise until the solution gives a negative starch-iodide test. Stir for 30 minutes, filter and evaporate to a residue containing the seco-dialdehyde derivative of tetra-N-acetylantibiotic G-418 represented by formula 6A wherein R is acetyl and Z represents a 4-O-linked-tri-N-acetylgaramine residue.

B. Sodium Borohydride Reduction

Dissolve a sample of the seco-dialdehyde derivative of tetra-N-acetylantibiotic G-418 obtained in Example 9A in methanol, cool the solution to 0°C and treat with sodium borohydride in a manner described in Example 1B to obtain a solution comprising the corresponding seco-dihydroxy intermediate represented by the formula 6B when R is acetyl and Z represents the 4-O-linked-tri-N-acetylgaramine residue.

C. 1,3,3'-Tri-N-Acetylgaramine

In a manner similar to that described in Example 1C, treat the methanolic solution containing the seco-dihydroxy intermediate of Example 9B with 6N hydrochloric acid. Isolate and purify the resultant product in a manner similar to that described in Example 1C to obtain 1,3,3'-tri-N-acetylgaramine; $[\alpha]_D^{26}$ + 100.3°(0.3 percent in methanol).

EXAMPLE 10

Preparation of 1,3,3'-tri-N-acetylgaramine from Per-N-Acetylgentamicins B, $B_1$, $X_2$ or From a Mixture Thereof A. To a solution of 150 mg. of 1,3,6',3''-tetra-N-acetylgentamicin B in 50 ml. of methanol-water (1:1), add 99 mg. of sodium meta-periodate. Stir the reaction mixture at room temperature until thin layer chromatographic analysis of an aliquot shows almost no starting compound. Add ethylene glycol dropwise until the solution gives a negative starch-iodide test, then separate the resultant precipitate by filtration to give a filtrate comprising the seco-dialdehyde derivative of 1,3,6',3''-tetra-N-acetylgentamicin B which is represented by structural formula 2B(1) wherein R is acetyl and Z represents the 4-O-linked-tri-N-acetylgaramine residue.

Treat each of 1,3,6',3''-tetra-N-acetylgentamicin $B_1$, 1,3,2',3''-tetra-N-acetylgentamicin $X_2$ and a mixture comprising tetra-N-acetylgentamicins B, $B_1$ and $X_2$ in a manner similar to that described above to obtain solutions containing the seco-dialdehyde derivatives of tetra-N-acetylgentamicin $B_1$ (represented by formula 1A wherein R is acetyl), tetra-N-acetylgentamicin $X_2$ (represented by formula 2A(2)), and a product mixture comprising the seco-dialdehyde derivatives of gentamicins B, $B_1$ and $X_2$, respectively.

B. In a manner similar to that described in Example 1B, treat each of the solutions containing the seco-dialdehyde gentamicin derivatives obtained in Example 10A with sodium borohydride at room temperature whereby are obtained solutions containing the corresponding seco-dihydroxy derivatives of tetra-N-acetylgentamicin B, tetra-N-acetylgentamicin $B_1$, tetra-N-acetylgentamicin $X_2$, and a mixture of the foregoing, respectively, which are represented by structural formulae 2B(1), 1B, 2B(2) and a mixture thereof, respectively, wherein R is acetyl and Z represents a 4-O-linked-tri-N-acetylgaramine moiety.

C. 1,3,3'-tri-N-acetylgaramine

In a manner similar to that described in Example 1C, add 6N hydrochloric acid to each of the reaction solutions prepared in Example 10B until each of the solutions has reached a pH of about 1. Isolate and purify the resultant product from each solution in a manner similar to that described in Example 1C to obtain 1,3,3'-tri-N-acetylgaramine.

EXAMPLE 11

Preparation of 1,3,3'-tri-N-acetylgaramine from Penta-N-acetyl derivatives of Antibiotic JI-20 Complex and From Antibiotic JI-20A and Antibiotic JI-20B A. Seco-Dialdehyde Derivative of Penta-N-Acetylantibiotic JI-20 Complex Dissolve 350 mg. of 1,3,2',6',3''-penta-N-acetylantibiotic and 20 complex in 5 of water and add 240 mg. of sodium metaperiodate. Keep JI-reaction mixture in the dark for three days, add 54 mg. additional sodium meta-periodate and store in the dark for an additional five days. Filter the reaction mixture and pass the filtrate through a column of IR 45 ion exchange resin, eluting with distilled water. Lyophilize the total eluate to obtain a residue comprising the seco-dialdehyde derivative of 1,3,2',6',3''-penta-N-acetylantibiotic JI-20 complex comprising a mixture of the seco-dialdehyde derivatives of penta-N-acetylantibiotic JI-20A and of penta-N-acetylantibiotic JI-20B represented by formulae 3A and 4A respectively, wherein R is acetyl and Z is the 4-O-linked-tri-N-acetylgaramine residue.

B. The Seco-Dihydroxy Derivative of 1,3,2',6',3''-Penta-N-Acetylantibiotic JI-20 Complex Dissolve 1 g. of the seco-dialdehyde derivative of penta-N-Antibiotic JI-20 complex prepared in Example 11B in 50 ml. of methanol cooled to 0°C, then add 500 mg. of sodium borohydride. Stir the reaction mixture at room temperature for three days to obtain a solution comprising the seco-dihydroxy derivative of penta-N-acetylantibiotic JI-20 complex comprising the seco-dihydroxy derivative of penta-N-acetylantibiotic JI-20A and the seco-dihydroxy derivative of penta-N-acetylantibiotic JI-20B, said compounds represented by formulae 3B and 4B, respectively, wherein R is acetyl and Z represents a 4-O-linked-tri-N-acetylgaramine residue C. 1,3,3'-Tri-N-Acetylgaramine In a manner similar to that described in Example 1C, treat the methanolic solution containing the seco-dihydroxy intermediate of penta-N-acetylantibiotic JI-20 complex with 6N hydrochloric acid. Isolate and purify the resultant product in a manner similar to that described in Example 1C to obtain 1,3,3'-tri-N-acetylgaramine.

D. In similar manner, subject each of penta-N-acetylantibiotic JI-20A and penta-N-acetylantibiotic JI-20B to the procedures of Examples 11A, 11B and 11C to obtain 1,3,3'-tri-N-acetylgaramine.

EXAMPLE 12

Prepration of 1,3,3'-Tri-N-Benzoylgaramine

A. Seco-dialdehyde Derivative of 1,3,6',3''-tetra-N-Benzoylgentamicin B

In a manner similar to that described in Example 1A, treat a methanolic solution of 1,3,6',3''-tetra-N-benzoylgentamicin B with sodium meta-periodate at room temperature, then with ethylene glycol. Remove any precipitate by filtration to yield a filtrate containing the seco-dialdehyde derivative of 1,3,6',3''-tetra-N-benzoylgentamicin B represented by formula 2B(1) wherein R is benzoyl.

B. Seco-Dihydroxy Derivative of 1,3,6',3''-Tetra-N-Benzoylgentamicin B

In a manner similar to that described in Example 1B, add sodium borohydride to the methanolic solution containing the seco-dialdehyde derivative of 1,3,6',3''-tetra-N-benzoylgentamicin B whereby is obtained a solution containing the corresponding seco-dihydroxy intermediate represented by the formula 2C(1) wherein R is benzoyl and $R_1$ is hydrogen and Z represents the 4-O-linked-tri-N-benzoylgaramine moiety.

C. 1,3,3'-Tri-N-Benzoylgaramine

In a manner similar to that described in Example 1C, treat the methanolic solution containing the seco-dihydroxy intermediate of 1,3,6',6''-tetra-N-benzoylgentamicin B with 6N hydrochloric acid. Isolate and purify the resultant product in a manner similar to that described in Example 1C to obtain 1,3,3'-tri-N-benzoylgaramine.

In similar manner, subject the following per-N-benzoylaminoglycoside derivatives to the procedures of Example 12A–12C to obtain 1,3,3'-tri-N-benzoylgaramine:

1,3,6',3''-tetra-N-benzoylgentamicin $B_1$;
1,3,2',3''-tetra-N-benzoylgentamicin $X_2$;
a mixture of tetra-N-benzoylgentamicin B, $B_1$ and $X_2$;
1,3,2',3''-tetra-N-benzoylantibiotic G-418;
1,3,2',6',3''-penta-N-benzoylantibiotic JI-20A;
1,3,2',6',3''-penta-N-benzoylantibiotic JI-20B and mixtures thereof; and
1,3,2',6',3''-penta-N-benzoylantibiotic JI-20 complex.

EXAMPLE 13

GARAMINE

1. Heat 500 mg. of 1,3,3'-tri-N-acetylgaramine in 25 ml. of 4N sodium hydroxide in a sealed vessel at 110°C for 96 hours. Pass the solution through a column of IRC-50 resin ($NH_4^-$ cycle). Wash the column with two column volumes of water followed by 0.1N ammonium hydroxide. Monitor the fractions by thin layer chromatography, combine the like fractions containing garamine, and evaporate to a residue comprising garamine.

In similar manner, treat 1,3,3'-tri-N-benzoylgaramine and 1,3,3'-tri-N-carbobenzyloxygaramine with aqueous sodium hydroxide and isolate and purify the resultant product as described hereinabove to obtain garamine.

2. Dissolve 1 g. of 1,3,3'-tri-N-carbomethoxygaramine in 10 percent aqueous barium hydroxide. Heat with stirring at 44°C for 96 hours. Cool the reaction mixture, neutralize with excess carbon dioxide (dry ice), filter the resultant precipitate, and triturate the precipitate twice with water. Combine the aqueous filtrates and evaporate in vacuo to a residue. Treat the residue with water, filter, and concentrate the filtrate to a residue comprising garamine.

In similar manner, treat 1,3,3'-tri-N-carboethoxygaramine and 1,3,3'-tri-N-carbo(2,2,2-trichloroethoxy)garamine with 10 percent barium hydroxide and isolate and purify the resultant product in the manner described to obtain garamine.

I claim:

1. The process for preparing a garamine derivative having amino-protecting groups which comprises the reaction of a pseudotrisaccharide having a garamine moiety 4-O- glycosidically linked to another pyranoside sugar which possesses an amino function and vicinal hydroxyl groups, said pseudotrisaccharide having amino-protecting groups selected from the group consisting of lower alkanoyl, aroyl, arylalkanoyl, alkoxycarbonyl, and arylalkoxycarbonyl, with a glycol cleaving reagent selected from the group consisting of a periodate salt and a lead (IV) salt; the reaction of the seco-dialdehyde derivative thereby formed with a metal borohydride; and treatment of the seco-dihydroxy derivative thereby formed with dilute aqueous acid to a pH of about 1.

2. The process of claim 1 wherein said pseudotrisaccharide has a garamine moiety 4-O-glycosidically linked to another pyranoside sugar which possesses an amino function and vicinal, trans diequatorial hydroxyl groups; and wherein said pseudotrisaccharide has amino-protecting groups selected from the group consisting of benzyloxycarbonyl, 2,2,2-tri-chloroethoxycarbonyl, lower alkoxycarbonyl, lower alkanoyl, and aroyl having up to eight carbon atoms.

3. The process of claim 2 followed by removal of the amino-protecting groups, whereby garamine is formed.

4.. The process of claim 2 for preparing an amino-protected garamine derivative represented by the following formula I:

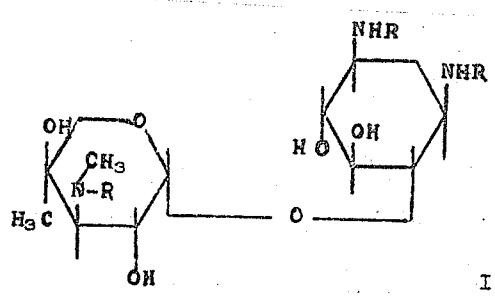

I wherein R is an amino-protecting group selected from the group consisting of benzyloxycarbonyl, 2,2,2-trichloroethoxycarbonyl, lower alkoxycarbonyl, lower alkanoyl and aroyl having up to eight carbon atoms; which comprises treating starting material selected from the group consisting of an amino-protected pseudotrisaccharide represented by the following formula II and mixtures thereof:

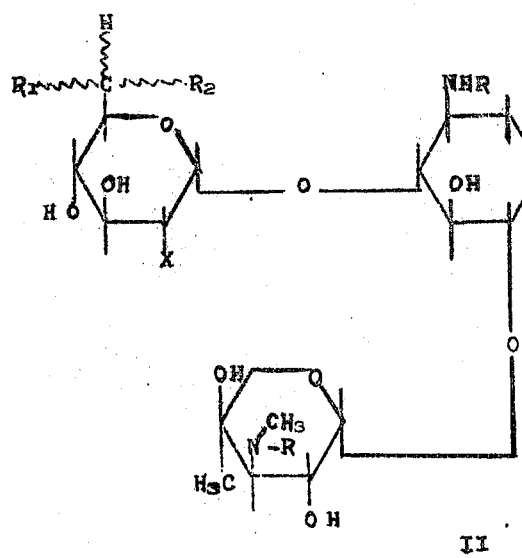

II wherein R is as hereinabove defined, $R_1$ is a member selected from the group consisting of hydrogen and methyl, $R_2$ and X are each a member selected from the group consisting of —NHR and hydroxy;

with a glycol cleaving reagent selected from the group consisting of a periodate salt and a lead(IV) salt, treating with a metal borohydride the thereby formed compound selected from the group consisting of a seco-dialdehyde intermediate represented by the following formula III and mixtures thereof:

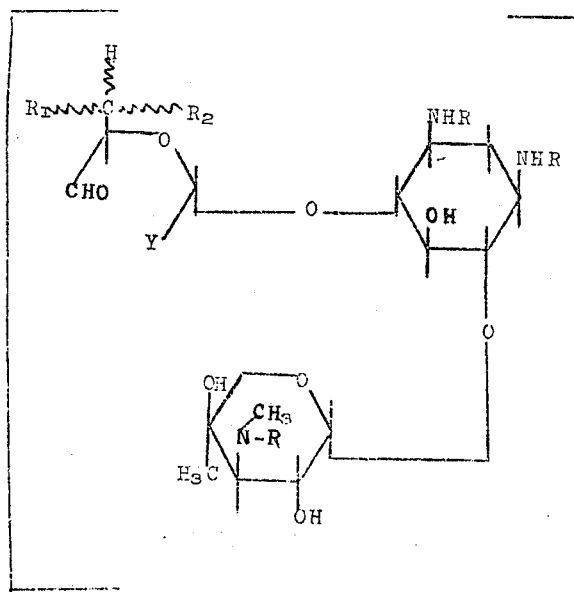

III wherein R, $R_1$ and $R_2$ are as hereinabove defined, and Y is a member selected from the group consisting of —CHO and

and trating with dilute aqueous acid the thereby formed member selected from the group consisting of seco-dihydroxy intermediate represented by the following formula IV and mixtures thereof:

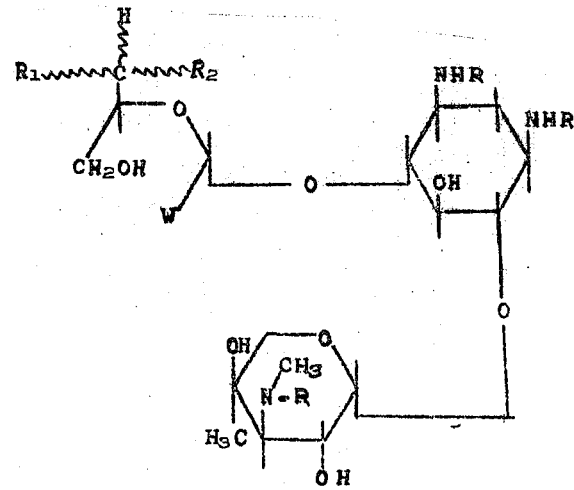

IV wherein R, R₁ and R₂ are as above defined, and W is a member selected from the group consisting of —CH₂OH and

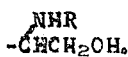

5. The process of claim 4 wherein R is a member selected from the group consisting of benzyloxycarbonyl, 2,2,2-trichloroethoxycarbonyl, ethoxycarbonyl, methoxycarbonyl, acetyl and benzoyl.

6. The process of claim 4 wherein R is benzyloxycarbonyl.

7. The process of claim 4 wherein said glycol cleaving reagent is an alkali metal meta-periodate and said metal borohydride is an alkali metal borohydride.

8. The process of claim 4 wherein said starting material is an amino-protected pseudotrisaccharide represented by formula II or mixtures thereof wherein R is benzyloxycarbonyl; said glycol cleaving reagent is sodium meta-periodate; said metal borohydride is sodium borohydride; and said aqueous acid is hydrochloric acid, whereby is formed 1,3,3'-tri-N-carbobenzyloxygaramine.

9. The process of claim 8 wherein said amino-protected pseudotrisaccharide is 1,3,6',3''-tetra-N-carbobenzyloxygentamicin B₁.

10. The process of claim 8 wherein said starting material is a mixture of amino-protected pseudotrisaccharides represented by formula II comprising 1,3,6',3''-tetra-N-carbobenzyloxygenatmicin B, 1,3,6',3''-tetra-N-carbobenzyloxygentamicin B₁, and 1,3,2',3''-tetra-N-carbobenzyloxygentamicin X₂.

11. The process of claim 8 wherein said starting material is a mixture of amino-protected pseudotrisaccharides represented by formula II comprising 1,3,2',6',3''-penta-N-carbobenzyloxyantibiotic JI-20A and 1,3,2',6',3''-penta-N-carbobenzyloxyantibiotic JI-20B.

12. The process of claim 8 wherein said amino-protected pseudotrisaccharide is 1,3,2',6',3''-penta-N-carbobenzyloxyantibiotic JI-20B.

13. The process of claim 8 wherein said amino-protected pseudotrisaccharide is 1,3,2',3''-tetra-N-carbobenzyloxyantibiotic G-418.

14. The process of claim 8 followed by removal of the amino-protecting group and isolation of garamine thereby formed.

15. A compound represented by the following formula IV:

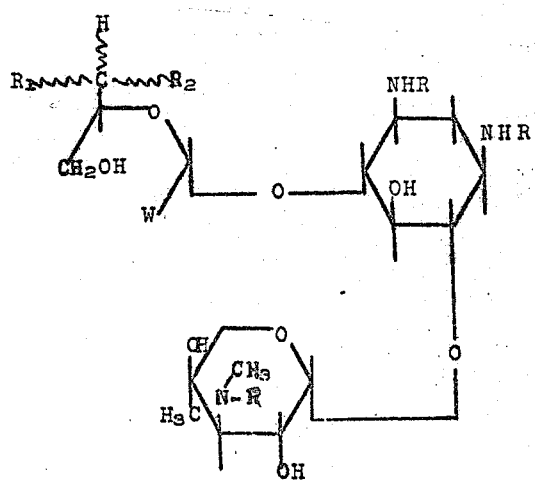

IV wherein R is a member selected from the group consisting of hydrogen and an amino-protecting group selected from the group consisting of benzyloxycarbonyl, 2,2,2-trichloroethoxycarbonyl, methoxycarbonyl, ethoxycarbonyl, acetyl and benzoyl; R₁ is a member selected from the group consisting of hydrogen and methyl; R₂ is a member selected from the group consisting of hydroxy and —NHR; and W is a member selected from the group consisting of —CH₂OH and

16. The compound of claim 15 wherein R is benzyloxycarbonyl.

17. The compound of claim 15 wherein R is benzyloxycarbonyl, R₁ is hydrogen, R₂ is N-benzyloxycarbonylamino; and W is —CH₂OH.

18. The compound of claim 15 wherein R is benzyloxycarbonyl; R₁ is methyl, R₂ is N-benzyloxycarbonylamino; and W is —CH₂OH.

19. The compound of claim 15 wherein R is hydrogen, R₁ is methyl, R₂ is amino and W is —CH₂OH.

20. The compound of claim 15 wherein R is benzyloxycarbonyl, R₁ is methyl, R₂ is N-benzoyloxycarbonylamino and W is

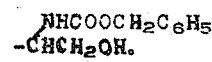

21. The process for preparing a garamine derivative having amino-protecting groups which comprises the treatment with dilute aqueous acid to a pH of about 1 of a member selected from the group consisting of a seco-dihydroxy compound of the following formula and mixtures thereof:

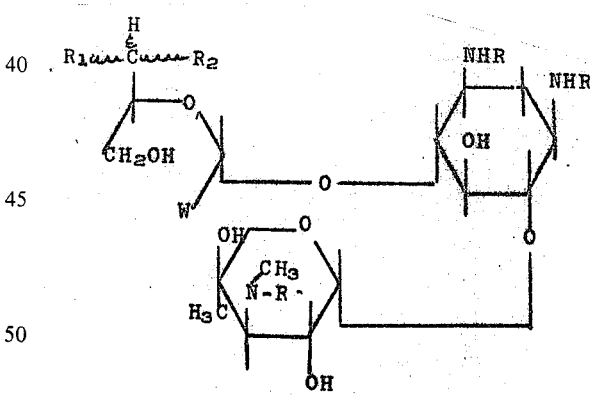

wherein R is a member selected from the group consisting of lower alkanoyl, aroyl, arylalkanoyl, alkoxycarbonyl and arylalkoxycarbonyl;
R₁ is a member selected from the group consisting of hydrogen and methyl;
R₂ is a member selected from the group consisting of hydroxy and —NHR; and
W is a member selected from the group consisting of —CH₂OH and

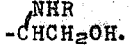

22. The process of claim 21 wherein said acid is a member selected from the group consisting of sulfuric acid, phosphoric acid, perchloric acid, hydrochloric acid and an acid ion exchange resin.

23. The process of claim 21 wherein R is benzyloxycarbonyl and said acid is hydrochloric acid.

* * * * *

UNITED STATES PATENT AND TRADEMARK OFFICE
CERTIFICATE OF CORRECTION

PATENT NO. : 3,872,080
DATED : March 19, 1976
INVENTOR(S) : Peter J. L. Daniels

It is certified that error appears in the above-identified patent and that said Letters Patent are hereby corrected as shown below:

Column 2, line 48, "sugar glycocsidically" should read---sugar glycosidically---. Column 3, line 28, "groups up to" should read---groups having up to---. Column 4, line 8, "glycopyranosyl" should read---glucopyranosyl---. Column 4, line 56, "Antibiotic C-418" should read---Antibiotic G-418---. Column 5, line 18, "solution indicator" should read---solution indicates---. Column 7, line 16, "Isolating of the" should read---Isolation of the---. Column 7, line 34, "deblocked" should read---"deblocked"---. Column 8, lines 50-51, "1,3,3'-N-carbobenzyloxygaramine" should read---1,3,3'-tri-N-carbobenzyloxygaramine---. Column 17, line 23, under formula, "  " should read---3B---. Column 18, line 24, under formula, "  " should read---4B---. Column 25, line 2, "in 5 of water" should read---in 5 ml. of water---. Column 25, line 3, "Keep JI-reaction" should read---Keep the reaction---. Column 26, line 28, "NH$_4^-$cycle)." should read---(NH$_4^+$cycle).---. Column 27, line 34, claim 4, "comprises treating starting material" should read---comprises the reaction of a starting material---. Column 28, lines 3,4, Claim 4, "salt, treating with a metal borohydride the therefy" should read---salt; treatment with a metal borohydride of the thereby---. Column 28, line 44, Claim 4, "and trating with dilute aqueous acid the thereby" should read---and treatment with dilute aqueous acid to a pH about 1 of the thereby---. Column 30, line 27, Claim 20, "benzoyloxycarbonylamino" should read---benzyloxycarbonylamino---.

Signed and Sealed this eighteenth Day of May 1976

[SEAL]

Attest:

RUTH C. MASON
Attesting Officer

C. MARSHALL DANN
Commissioner of Patents and Trademarks